United States Patent [19]
Pletcher et al.

[11] 4,066,600
[45] Jan. 3, 1978

[54] FRICTION-ACTIVATABLE ADHESIVE AND ARTICLES THEREOF

[75] Inventors: Wayne A. Pletcher, Roseville; Roy Wong, St. Paul, both of Minn.

[73] Assignee: Minnesota Mining and Manufacturing Company, St. Paul, Minn.

[21] Appl. No.: 632,573

[22] Filed: Nov. 17, 1975

[51] Int. Cl.$^2$ .................. C08K 5/12; C08K 5/51; C08L 67/02; C08L 93/00

[52] U.S. Cl. .................. 260/30.6 R; 106/19; 156/332; 260/26; 260/28 R; 260/31.8 M; 260/33.4 R; 260/842; 260/843; 260/858; 260/873; 428/355; 428/449; 428/481

[58] Field of Search .............. 260/31.8 M, 30.6 R, 260/26, 28, 858, 873, 26, 28, 33.4 R, 842, 843

[56] References Cited

U.S. PATENT DOCUMENTS

| | | | |
|---|---|---|---|
| 3,267,052 | 8/1966 | Brennan | 260/5 |
| 3,539,481 | 11/1970 | Parker | 260/27 |
| 3,644,267 | 2/1972 | Jackson et al. | 260/33.6 R |
| 3,832,314 | 8/1974 | Hoh et al. | 260/26 |
| 3,931,077 | 1/1976 | Uchigaki et al. | 260/26 |
| 3,944,516 | 3/1976 | Petke | 260/40 R |

*Primary Examiner*—Stanford M. Levin
*Attorney, Agent, or Firm*—Cruzan Alexander; Donald M. Sell; Donald C. Gipple

[57] ABSTRACT

A friction-activatable adhesive composition comprising a mixture of a crystallizable linear polyester, a tackifier and, optionally, a plasticizer therefor and adhesive sticks prepared from the adhesive compositions.

12 Claims, No Drawings

FRICTION-ACTIVATABLE ADHESIVE AND ARTICLES THEREOF

FIELD OF THE INVENTION

This invention concerns a friction-activatable adhesive composition comprising a mixture of a crystallizable linear polyester, a tackifier and, optionally, a plasticizer therefor and adhesive sticks prepared from the adhesive compositions.

BACKGROUND OF THE INVENTION

A number of adhesive stick constructions (i.e. sticks or rods of solid adhesive which are activated by rubbing against materials to be bonded) are known to the art. These constructions have not, however, enjoyed wide acceptance due primarily to the fact that they are relatively inconvenient to use. The compositions disclosed in U.S. Pat. Nos. 3,539,481 and 3,267,052 are representative. U.S. Pat. No. 3,539,481 describes adhesive sticks composed of amorphous soft polypropylene, amorphous hard polypropylene, rosin, vicinyl glycol and a wax mixture which can be utilized as a paper adhesive, i.e. by rubbing one piece of paper with the adhesive, applying a second piece of paper over the rubbed area and then rubbing the exposed side of the second piece of paper until the adhesive has been reheated sufficiently to become thermoplastic and form the bond. U.S. Pat. No. 3,267,052 describes an adhesive stick composed of soft wax, soft rubber, and hard resin which must be lifted from the surface to be adhered (e.g. paper) at the end of each rubbing stroke to prevent the adhesive already laid down on the paper from being balled up and removed from the paper by the return stroke. With the later, as with the former, the maximum bonding strength is attained only if the adhesive is heated and allowed to reharden after the paper/adhesive/paper construction has been completed.

THE PRESENT INVENTION

The present invention relates to friction-activatable adhesive compositions containing a linear polyester, a tackifier and, optionally, a plasticizer therefor. These compositions can be used as adhesive sticks by rubbing the end of a stick thereof (conveniently the stick is about 1 centimeter square in cross section and about 8 centimeters in length and is wrapped with paper, foil, or other similar material) rapidly in a back and forth or circular motion on a surface to be bonded, and then pressing a second surface against the sticky coating thus formed. Thus, the adhesive is applied by scribbling as with a child's crayon. A second surface is pressed against the first within a short time after the rubbing operation is completed (usually within 3 minutes thereof) and a firm bond is formed within a few minutes thereafter. Various materials, such as paper, fabrics, leather, light wood, foils, and the like can be conveniently and durably bonded in this way. The compositions of the invention can be easily removed from clothing, furniture, etc.

The friction-activatable solvent-free adhesive compositions of the present invention comprise a mixture of 1. 25 to 95 parts by weight of a thermoplastic linear polyester having crystallizable ester units of the formula:

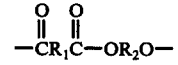

wherein $R_1$ consists of divalent radicals remaining after removal of the carboxyl groups from one or more saturated aliphatic dicarboxylic acids and/or aromatic dicarboxylic acids, $R_1$ containing from 2 to 8 carbon atoms when it is an aliphatic radical and 6 to 13 carbon atoms when it is an aromatic radical, $R_2$ consists of divalent radicals remaining after removal of the hydroxyl groups from one or more saturated aliphatic diols containing from 2 to 12 carbon atoms, said polyester having a DTA melting temperature of from about 40° to 75° C. and an inherent viscosity of at least 0.2 dl/g at 25° C., as measured in a 0.5 g/dl solution of polymer in chloroform at 25° C., 2. 5 to 50 parts by weight of a tackifier for the polyester having the ability to lower its melting temperature and to raise its glass transition temperature, 3. 0 to 25 parts by weight of a plasticizer for the polyester having the ability to lower its melting temperature and glass transition temperature and to reduce its cohesive strength, the sum of (1), (2) and (3) being 100 parts by weight, said mixture being compatible, having a. a softening temperature of at least about 40° C.,
b. a write on factor of at least about 0.06
c. an open time of from about ⅓ to about 10 minutes,
d. peel adhesion in the open state of not less than about 50 grams per centimeter, and
e. peel adhesion in the closed (solid, nonbondable) state of not less than about 100 grams per centimeter.

A number of physical properties are balanced in these compositions. The softening temperature of at least about 40° C. assumes that they will not become too tacky or fluid to hand hold or store. At the same time, an unduly high softening temperature will render the adhesive difficult or impossible to friction activate and will detract from other properties such as the write on factor and open time. The write on factor relates to the quantity of adhesive which is deposited on the substrate while rubbing. The physical effort required in rubbing should be neither too high nor too low. If the effort required to transfer a given amount of adhesive is too small, it is likely that too much adhesive will be applied (which is wasteful and can be messy). On the other hand, if the effort required to transfer a given quantity of adhesive is too great, inadequate adhesive will be transferred to the surface to be adhered to allow a firm bond to be achieved. The open time is the interval during which the adhesive remains bondable after being cooled below the softening temperature (once it has been heated by frictional heat above the softening temperature). This should be sufficiently long to allow the pieces which are to be adhered to be positioned in contact but no so long that there is an undue wait for the firm bond to develop. Preferably the open time of the compositions of the invention is at least about one minute. The peel adhesion in the open state is desirably great enough to hold two pieces to be adhered (e.g. paper) together against their own weight but low enough to allow repositioning of the pieces without damaging them by delamination, etc. The peel adhesion in the closed state is desirably great enough to hold the pieces together strongly but not so great that the adhesive cannot be removed from desk tops and the like. Since adhesive sticks are most often used to adhere paper to paper, the closed state peel thereof should be sufficient to delaminate ordinary construction and writing paper.

The adhesive compositions of the present invention are compatible, i.e. there is no separation into distinct layers between the polyester, the tackifier and the plasticizer at the softening temperature of the adhesive composition.

The linear polyesters are prepared from precursors which are difunctional with respect to carboxyl and hydroxyl, for example organic diols (glycols) and dicarboxylic acids. The carboxyl and hydroxyl functions most often appear in the precursors as the free acid and free base but can also appear as simple derivative functions such as esters, acid chlorides or anhydrides if desired.

The polyesters can be prepared by conventional polycondensation polyester-forming reactions wherein one or more diacids or their equivalents (e.g. volatile alcohol esters, acid chlorides or anhydrides of the diacids) are caused to react with an equivalent amount of one or more diols. It is preferable that the polyester reaction be carried out in the presence of a suitable catalyst. They are generally carried out in the melt, however, a solvent may be utilized for azeotropic removal of the condensation by-product. It is advantageous to use a mechanical stirrer and to monitor the reaction by the increase in torque on the stirrer. On completion of the reaction, the polyester can be removed from the reaction vessel by pouring at the final reaction temperature under an inert atmosphere.

The polycondensation reaction is facilitated by the use of excess short chain diol (e.g. an excess of about 5 to 50% by weight of the total components of the polyester) which can then be removed in the final stages of the polycondensation. It is more often preferred, however, because of the low vapor pressure of some of the diols and the consequent difficulty of removal, to use only the stoichiometric amount of the diols.

The choice of catalyst depends on the starting materials. Thus, the diacid alone may function as a suitable esterification catalyst in some cases. Compounds having an ionization constant greater than about $10^{-3}$, such as, for example, p-t-butylbenzenesulfonic acid may also be used. For esterification by ester interchange, an ester interchange catalyst is used. Suitable catalysts include, for example manganous acetate, calcium acetate, zinc acetate, sodium methoxide, antimony oxide, antimony glycoxide, tetraalkyltitanates, complex titanates such as magnesium hexaalkyltitanates or other suitable ester interchange catalysts as described in the literature relating to the preparation of polyesters. A preferred catalyst is tetrabutyl titanate.

It is also preferably to carry out the polymerization reaction in the presence of an antioxidant such as sym-di-β-naphthyl-p-phenylenediamine or 1,3,5-trimethyl,-2,4,6-tris(3,5-di-t-butyl-4-hydroxybenzyl)benzene or a hindered polyphenol such as those available from the Ciba-Geigy Company under the trade designations Irganox 1010 and 1076.

More particularly the polyesters are prepared by charging stoichiometric quantities of acid and glycol to a reactor, normally with a small amount of an antioxidant. With mild agitation the reactor is heated to about 170°–180° C. under an inert atmosphere. After an initial reaction period, e.g. of about 2 to 3 hours, the pressure is reduced to about 5 to 0.25 millimeters of mercury and these conditions are maintained for a period of time, conveniently ½ to 1 hour, to remove volatiles. The water or other volatiles being formed by condensation in the reaction can be collected and measured to indicate the completeness of the esterification reaction. Catalyst is then added and the temperature is maintained or increased slightly and the pressure is preferably reduced further (e.g. to 0.25 millimeters of mercury or lower). These conditions are then maintained for perhaps 1 to 4 hours, i.e. until the esterification is complete as indicated by an inherent viscosity measurement. The adhesive composition can be prepared directly at this time by the addition of the tackifier and the plasticizer. Pigments, dyes, or oxidation inhibitors may also be added at this time if desired.

Among the aliphatic dicarboxylic acids suitable for use in preparing these polyesters are succinic, glutaric, adipic, pimelic, suberic, azelaic, sebacic, 1,4-cyclohexanedicarboxylic, 1,3-cyclopentanedicarboxylic, 2-methylsuccinic, 2-methylpentanedioic, 3-methylhexanedioic acids and the like. Examples of suitable aromatic acids are terephthalic acid, isophthalic acid, phthalic acid, 4,4'-benzophenone dicarboxylic acid, 4,4'-diphenylmethanedicarboxylic acid, 4,4'-diphenylether dicarboxylic acid, 4,4'-diphenylthioether dicarboxylic acid, 4,4'-diphenylamine dicarboxylic acid. etc. Preferably $R_1$ (the structure between the carboxyl groups in these acids) contains only carbon and hydrogen. The aliphatic diacids are preferred.

Branched, unbranched, and cyclic aliphatic diols having 2 to 12 carbon atoms, such as, for example, ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, 1,8-octanediol, cyclobutane-1,3-di(2'-ethanol), cyclohexane-1,4-dimethanol, 1,10-decanediol, and 1,12-dodecanediol are suitable for use in preparing the polyesters. The preferred diols are 1,5-pentanediol and cyclohexane-1,4-dimethanol which may be a mixture of cis-trans isomers such as a mixture containing about 30% cis-and 70% trans-cyclohexane-1,4-dimethanol.

The tackifiers are generally selected from low molecular weight thermoplastic resins including hydrocarbon resins such as coumerone-indene resins, petroleum resins, styrene polymers, cyclopentadiene resins and terpene resins, bituminous asphalts, coal tar pitches, rosins, phenolic resins, chlorinated aliphatic hydrocarbon waxes, and chlorinated polynuclear aromatic hydrocarbons. The phenolic resins are reaction products of one or more members of the class consisting of phenol itself, cresols, xylenols, p-tert-butylphenol and p-phenylphenol with one or more members of the class consisting of formaldehyde, acetaldehyde and furfuraldehyde. Reference is made to U.S. Pat. No. 3,832,314 at Columns 7 through 9 for a general discussion of these materials. The preferred tackifiers are terpene-urethane reaction products. Specific tackifiers suitable for use in the present composition include Isoterp 95 (a terpene-urethane-type tackifier produced from Abitol (a mono alcohol) and toluene diisocyanate, available from Schenectady Chemicals, Inc. of Schenectady, New York); Piccotex 75 (a hydrocarbon resin formed by polymerizing vinyl toluene and α-methyl styrene, available from Hercules, Inc.); Wingtak 95 (a synthetic polyterpene resin available from Goodyear); and Foral 85 (a highly stabilized esterified wood rosin material having a ring and ball softening point of 85° C., available from Hercules, Inc.).

Among the plasticizers suitable for use in the compositions of the invention are phthalates (including dimethylphthalate, diethylphthalate, di-n-hexylphthalate and dioctyl phthalate), phosphates (including tributylphosphate, triphenylphosphate and tricresylphosphate), Abitol (hydroabietyl alcohol available from Hercules, Inc.), and Bakelite CKM (p-t-butylphenol-phenolic resin available from Union Carbide Company). The phthalate and phosphate plasticizers are preferred, due to their compatibility and effectiveness in the compositions together with their easy availability and relatively low cost.

The adhesive compositions of the invention can be modified by the incorporation of fillers, pigments, dyes and other modifiers where opacity, color, or other effects are desired. Thus, particulate alumina, titania, glass microbubbles, clay, chalk, aluminum, zinc, chromic oxide, phthalocyanine blue and the like may be added.

The adhesive sticks are normally formed by pouring the homogeneous melted adhesive composition into polyethylene or other suitable tubing and allowing the adhesive to cool. Removal of the tubing provides adhesive sticks that are stable to normal environmental conditions. The adhesive stick may be of any convenient cross sectional diameter and shape. Generally it has been found that a cylindrical or square cross sectioned stick approximately 1 centimeter across is suitable. It is normally preferably circumferentially enclosed within a sheaf of metallic foil or plastic.

The softening temperature of the adhesive compositions is determined using a Fisher-Johns melting point apparatus set to rise in temperature at a rate of 2° C. per minute. The temperature taken is that at which the material softens and starts to turn translucent.

The write on factor is measured utilizing an apparatus with an oscillating base and in which an adhesive stick can be mounted vertically above and resting on the base. An adhesive stick approximately one centimeter by one centimeter in cross section and several centimeters long (e.g. 5 to 8 centimeters in length) is mounted in the apparatus and the bottom thereof is flattened by running it against a piece of paper clamped to the oscillating base. The adhesive stick is then weighed and replaced in the apparatus. A sample of 100% rag paper with a 20 lb. basis weight and a cockle finish is then clamped to the base and the base is set into motion at about 220 cycles per minute, the total distance traveled by the base being 6.9 centimeters per cycle. The preflattened end of the adhesive stick to be tested is lowered onto the oscillating base, the stick being pressed against the base with a force of about 2,720 grams. After 18 cycles the adhesive stick is lifted from the paper and reweighed. Its loss of weight in grams during the 18 cycles is the write on factor.

The open time is determined utilizing the same apparatus and sample preparation as in the procedure for determining the write on factor. The adhesive stick is run against the rag paper for 18 cycles to heat the adhesive on the end of the stick above its softening temperature and to transfer it to the rag paper sample on the base. As soon as the rubbing is stopped the adhesive on the rag paper sample cools to a temperature below its softening temperature. Thus, the opening open time for a particular adhesive stick is the elapsed time between the end of the rubbing cycles and the point at which the adhesive on the rag paper reverts to its non-bondable state. Whether the adhesive is still bondable after a particular interval is determined by placing a strip of 80 lb. basis weight construction paper (a relatively weak paper) in contact with the adhesive on the rag paper sample and pressing it down with four passes (twice in each direction) of a two kilogram roller. The composite sample is allowed to stand for thirty minutes and the two pieces of paper are then pulled apart. If delamination (of the construction paper) occurs, the adhesive was in the open state when the construction paper was applied. If delamination does not occur, the adhesive had already reverted to the closed, nonbondable state before the construction paper was applied. The open time for an adhesive stick is the maximum interval between the end of the rubbing cycle and the application of the construction paper to the adhesive on the rag paper which results in bonding. To determine this, several composite samples must be prepared and tested for delamination. The open time is ordinarily determined to an accuracy of at least about 10%.

The 180° peel adhesion is tested on an apparatus of the type described in "TEST METHODS FOR PRESSURE SENSITIVE TAPES", 6th Edition, Published by the Pressure Sensitive Tape Council, 1201 Waukegan Road, Glenview, Illinois 60025 and using a sample prepared as follows: An 0.13 millimeter (5 mil) thick film of the adhesive to be tested is knife coated onto a silicone release liner, the coating knife and the (molten) adhesive being at about 120° C. After cooling, the coated material is cut into 2.54 centimeter strips approximately 20 centimeters long. A composite test sample is prepared by placing the following on a 10 centimeter by 20 centimeter tin plated steel panel in the listed order: 100% rag paper as described above, the 2.54 centimeter by 20 centimeter adhesive strip (with the silicone liner removed), a 2.5 centimeter by 20 centimeter by 0.05 millimeter thick strip of aluminum foil (the dull side of the foil against the adhesive strip) and a centimeter by 20 centimeter glass plate. The assembled test sample is placed in an oven at about 80° C. for eight minutes. Thereafter the steel panel and the glass plate are removed and the sample is placed in a 21° C., 50% relative humidity atmosphere for testing. The open state peel adhesion test is run 5 minutes after removal of the sample from the oven. The carriage of the adhesion machine is set to move at a rate of about 229 centimeters (90 inches) per minute. The strip of 100% rag paper is attached to the carriage with double coated tape. The adapter ring leading from the meter on the machine is attached to the aluminum foil. The carriage is started and the value observed from the guage is recorded as the adhesion value in grams per centimeter. The closed state peel adhesion is run 24 hours after removal of the sample from the oven using the same procedure.

In addition to the properties mentioned previously, the polyesters suitable for use in the compositions of the invention are normally also characterized by:

1. DTA glass transition temperatures, $T_g$, below $-25°$ C.;

2. melt viscosity in the range of 1,000–3,000 cps at 175° C. (as determined by ASTM test procedure D3236-73);

3. number average polymer chain length, $A_N$ in the range of 100–200 (this number expressing the number average polymer chain length in angstrom units) and weight average polymer chain length, $A_W$, in the range of 300–500 (this number expressing the weight average polymer chain length in angstrom units). These values are determined utilizing the GEL PERMEATION CHROMATOGRAPHY as described in "PREPARATIVE METHODS OF POLYMER CHEMISTRY", 2nd Edition, by Sorenson and Campbell, Interscience Publishers, New York;

4. substantially complete solubility in toluene at 25° C. in the ratio of about 10% by weight by polyester and 90% by weight of solvent.

Normally also the polyesters have acid values of 15 or less, this being a measure of the completeness of the linear polymerization reaction. The end groups of the polymers can be either carboxyls or hydroxyls (or simple derivatives thereof), depending upon the exact balance of the precursors charged in the polymerization reaction.

The glass transition temperature (the temperature range at which an amorphous polymer changes from a brittle glassy state to a flexible rubbery state) is measured by differential thermal analysis in an atmosphere of helium at 740 mm. of mercury pressure at a temperature rise of 30° C./minute, the test ordinarily being run over the range of from about −140° to +200° C. The details of this method are described, for example, by C. B. Murphy in "Differential Thermal Analysis", R. C. Mackenzie, Editor, Volume I, pages 643 to 671, Academic Press, New York, 1970.

The acid number is the number of milligrams of potassium hydroxide per gram of polymer required when titrating to bromthymol blue endpoint.

The following non-limiting examples will illustrate the practice of the invention. Unless otherwise indicated, all parts, proportions and percentages are by weight.

EXAMPLE 1

Detailed Polyester Preparation

A 3-neck flask is fitted with a mechanical stirrer, a Dean-Starke trap-condenser, a thermometer, and a gas inlet for maintaining an inert atmosphere within the flask. The following are charged in the flask:
58.4 parts sebacic acid
41.6 parts 1,4-cyclohexanedimethanol
0.1 part Irganox 1010 (antioxidant)

Inert gas is introduced into the flask and the contents of the flask are brought to 170° C. by means of a heating oil bath. The mixture is stirred and held at this temperature for about three hours. During this time, water resulting from the condensation is collected in the trap. The temperature of the mixture is maintained at about 170° C., while the pressure is then reduced from about 5 to about 0.25 mm Hg. These conditions are maintained for about one-half hour to remove additional volatile material. About 0.1 part of tetrabutyltitanate catalyst is then added while maintaining the inert atmosphere. The temperature and pressure of the mixture are brought to 180° C. and 0.15 mm Hg and these conditions are maintained for approximately 1.5 hours.

The polymer solidifies to a tough, flexible, colorless, opaque material having a melt viscosity of 1200 cps at 175° C., an inherent viscosity of 0.27 dl/g, a DTA melt temperature ($T_m$) of about +46° C., a glass transition temperature ($T_g$) of −48° C. and an acid number (or value) of 13.

EXAMPLES 2-7

Additional Polyester Preparations

The polyesters of Examples 2-7 (shown in Table I) are prepared using the process of Example 1. Stoichiometric quantities are used in each case. All of these polyesters have inherent viscosities of at least about 0.2 dl/g.

Table I

| Polyester of Example No. | Reactants | | Melt Temp. ° C |
|---|---|---|---|
| 2 | azelaic acid | 1,5-pentanediol | 44 |
| 3 | azelaic acid | 1,6-hexanediol | 50 |
| 4 | sebacic acid | 1,5-pentanediol | 52.5 |
| 5 | sebacic acid | 1,6-hexanediol | 64 |
| 6 | adipic acid | 1,6-hexanediol | 55 |
| 7 | 1,4-cyclohexane dicarboxylic acid | 1,6-hexanediol | 40 |

EXAMPLE 8

Detailed Adhesive Preparation

To 82.6 parts of the polyester of Example 1, at 180° C, and under an inert atmosphere, is added 13.2 parts of Isoterp 95 tackifier with mixing for approximately 5 minutes. 4.2 Parts of Dioctylphthalate and 0.8 part of titanium dioxide pigment are then added with mixing for about 10-15 minutes and the composition is poured from the reaction vessel and allowed to solidify at room temperature.

This compatible material is tough and flexible and has a melt viscosity of 1000 cps at 175° C., an inherent viscosity of 0.24 dl/g, a glass transition temperature ($T_g$) of −38° C. and an acid number of 10.4.

EXAMPLES 9-15

Additional Adhesive Compositions

The adhesive compositions of Examples 9-15 (shown in Table II together with that of Example 8) are prepared using the process of Example 8. The compositions of Examples 9-14 conform to the present invention. The polyester of Example 1 and the composition of Example 15 (which contains no tackifier) are included for comparison.

Table II

| Example No. | Parts (by wt.) | Component |
|---|---|---|
| 8 | 82.6 | Polyester (1) |
|  | 13.2 | Tackifier (2) |
|  | 4.2 | Plasticizer (4) |
| 9 | 82.6 | Polyester (1) |
|  | 13.2 | Tackifier (2) |
|  | 4.2 | Plasticizer (5) |
| 10 | 82.6 | Polyester (1) |
|  | 13.2 | Tackifier (2) |
|  | 4.2 | Plasticizer (6) |
| 11 | 82.6 | Polyester (1) |
|  | 13.2 | Tackifier (3) |
|  | 4.2 | Plasticizer (4) |
| 12 | 82.6 | Polyester (1) |
|  | 13.2 | Tackifier (2) |
|  | 4.2 | Plasticizer (4) |
|  | 1.7 | Pitment ($TiO_2$) |
| 13 | 82.6 | Polyester (1) |
|  | 13.2 | Tackifier (2) |
|  | 4.2 | Plasticizer (4) |
|  | 0.8 | Pigment ($TiO_2$) |
| 14 | 82.6 | Polyester (1) |
|  | 13.2 | Tackifier (2) |
|  | 4.2 | Plasticizer (7) |
| 1 | 100.0 | Polyester (1) |
| 15 | 95.2 | Polyester (1) |
|  | 4.8 | Plasticizer (4) |
| Polyester: | (1) | The polyester of Example 1. |
| Tackifiers: | (2) | Isoterp 95. |
|  | (3) | Foral 85. |
| Plasticizers: | (4) | Dioctylphthalate. |
|  | (5) | Bakelite CKM |
|  | (6) | Tricresyl phosphate. |

Table II-continued

| Example No. | Parts (by wt.) | Component |
|---|---|---|
| | (7) | Abitol. |

The resulting adhesives are found to have the following characteristics:

| Example No. | Softening Temperature °C | Write On Factor | Open Time, Minutes | 180° Peel Adhesion (g/cm) Open State | 180° Peel Adhesion (g/cm) Closed State |
|---|---|---|---|---|---|
| 8 | 42 | .1112 | 6 | 250 | 245 |
| 9 | 41.5 | .0891 | 2½ | 506 | 390 |
| 10 | 40 | .1671 | 3½ | 272 | 273 |
| 11 | 41 | .0746 | 1 | 200 | 184 |
| 12 | 44 | .1200 | 1¾ | 445 | 323 |
| 13 | 44 | .0894 | 1¾ | 323 | 256 |
| 14 | 40 | .1460 | 4½ | 312 | 345 |
| 1 | 43 | .0836 | ½ | 156 | 128 |
| 15 | 43 | .1034 | <¼ | 122 | 100 |

What is claimed is:

1. A friction-activatable solvent-free adhesive composition comprising a mixture of
   1. 25 to 95 parts by weight of a thermoplastic linear polyester having crystallizable ester units of the formula:

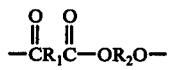

wherein $R_1$ consists of the divalent radical remaining after removal of the carboxyl groups from one or more saturated aliphatic dicarboxylic acids and/or aromatic dicarboxylic acids, $R_1$ containing from 2 to 8 carbon atoms when it is an aliphatic radical and 6 to 13 carbon atoms when it is an aromatic radical, $R_2$ consists of the divalent radical remaining after removal of the hydroxyl groups from one or more saturated aliphatic diols containing from 2 to 12 carbon atoms, said polyester having a DTA melting temperature of from about 40° to 75° C. and an inherent viscosity of at least 0.2 dl/g at 25° C., as measured in a 0.5 g/dl solution of polymer in chloroform at 25° C.,
   2. 5 to 50 parts by weight of a low molecular weight thermoplastic resin tackifier for the polyester selected from hydrocarbon resins, reaction products of hydroabietyl alcohol and toluene diisocyanate, bituminous asphalts, coal tar pitches, rosins, phenolic resins, chlorinated aliphatic hydrocarbon waxes and chlorinated polynuclear aromatic hydrocarbons, the phenolic resins being reaction products of one or more members of the class consisting of phenol itself, cresols, xylenols, p-tert-butylphenol and p-phenylphenol with one or more members of the class consisting of formaldehyde, acetaldehyde and furfuraldehyde, said tackifier having the ability to lower the melting temperature of the polyester and to raise its glass transition temperature,
   3. 0 to 25 parts by weight of a plasticizer for the polyester selected from phthalates, phosphates and hydroabietyl alcohol, said plasticizer having the ability to lower the melting temperature and glass transition temperature of the polyester and to reduce its cohesive strength, the sum of (1), (2) and (3) being 100 parts by weight, said mixture being compatible, and having
      a. a softening temperature of at least about 40° C.,
      b. a write on factor of at least about 0.06,
      c. an open time of from about ⅓ to about 10 minutes,
      d. peel adhesion in the open state of not less than about 50 grams per centimeter, and
      e. peel adhesion in the closed state of not less than about 100 grams per centimeter.

2. A composition according to claim 1 wherein the tackifier is a reaction product of hydroabietyl alcohol and toluene diisocyanate.

3. A composition according to claim 2 wherein the plasticizer is a phthalate.

4. A composition according to claim 1 wherein the plasticizer is a phthalate.

5. A composition according to claim 1 wherein the plasticizer is a phosphate.

6. A composition according to claim 1 consisting essentially of a mixture of about
   1. 80–85 parts of a thermoplastic linear polyester of sebacic acid and 1,4-cyclohexanedimethanol having a DTA melting temperature of about 45°–50° C. and an inherent viscosity of at least 0.2 dl/g at 25° C.,
   2. 10–15 parts of a tackifier produced from the interreaction of hydroabietyl alcohol and toluene diisocyanate,
   3. 2–5 parts of dioctylphthalate, the sum of (1), (2) and (3) being 100 parts, the composition having an open time of about 4–8 minutes.

7. An adhesive applicator stick comprising a mixture of
   1. 25 to 95 parts by weight of a thermoplastic linear polyester having crystallizable ester units of the formula

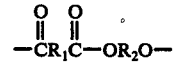

wherein $R_1$ consists of the divalent radical remaining after removal of the carboxyl groups from one or more saturated aliphatic dicarboxylic acids and/or aromatic dicarboxylic acids, $R_1$ containing from 2 to 8 carbon atoms when it is an aliphatic radical and 6 to 13 carbon atoms when it is an aromatic radical, $R_2$ consists of the divalent radical remaining after removal of the hydroxyl groups from one or more saturated aliphatic diols containing from 2 to 12 carbon atoms, said polyester having a DTA melting temperature of from about 40° to 75° C. and an inherent viscosity of at least 0.2 dl/g at 25° C., as measured in a 0.5 g/dl solution of polymer in chloroform at 25° C.,
   2. 5 to 50 parts by weight of a low molecular weight thermoplastic resin tackifier for the polyester selected from hydrocarbon resins, reaction products to hydroabietyl alcohol and toluene diisocyanate, bituminous asphalts, coal tar pitches, rosins, phenolic resins, chlorinated aliphatic hydrocarbon waxes and chlorinated polynuclear aromatic hydrocarbona, the phenolic resins being reaction products of one or more members of the class consisting of phenol itself, cresols, xylenols, p-tert-butylphenol and p-phenylphenol with one or more members of the class consisting of formaldehyde, acetaldehyde and furfuraldehyde, said tackifier having the ability to lower the melting temperature of the polyester and to raise its glass transition temperature, 3. 0 to 25 parts by weight of a plasticizer for the polyester selected from phthalates, phosphates and hydroabietyl alcohol, said plasticizer having the ability to lower the melting temperature and glass transition temperature of the polyester and to reduce its cohesive strength, the sum of (1), (2) and (3) being 100 parts by weight, said mixture being compatible and having
  a. a softening temperature of at least about 40° C.,
  b. a write on factor of at least about 0.06,
  c. an open time of from about ⅓ to about 10 minutes,
  d. peel adhesion in the open state of not less than about 50 grams per centimeter, and
  e. peel adhesion in the closed state of not less than about 100 grams per centimeter.

8. An adhesive applicator stick according to claim 7 wherein the tackifier is a reaction product of hydroabietyl alcohol and toluene diisocyanate.

9. An adhesive applicator stick according to claim 8 wherein the plasticizer is a phthalate.

10. An adhesive applicator stick according to claim 7 wherein the plasticizer is a phthalate.

11. An adhesive applicator stick according to claim 7 wherein the plasticizer is a phosphate.

12. An adhesive applicator stick according to claim 7 comprising a mixture of about
  1. 80–85 parts of a thermoplastic linear polyester of sebacic acid and 1,4-cyclohexanedimethanol having a DTA melting temperature of about 40°–50° C. and an inherent viscosity of at least 0.2 dl/g at 25° C.,
  2. 10–15 parts of a tackifier produced from the inter-reaction of hydroabietyl alcohol and toluene diisocyanate,
  3. 2–5 parts of dioctylphthalate, the sum of (1), (2) and (3) being 100 parts, the composition having an open time of about 4–8 minutes.

* * * * *